S Merrick

Screw-Blank Feeder,

No. 169.

Reissued May 7, 1850.

N. PETERS, PHOTO-LITHOGRAPHER, WASHINGTON, D. C.

UNITED STATES PATENT OFFICE.

SOLYMAN MERRICK, OF SPRINGFIELD, MASSACHUSETTS.

IMPROVEMENT IN FEEDERS FOR SCREW-MACHINES.

Specification forming part of Letters Patent No. 4,411, dated March 7, 1846; Reissue No. 169, dated May 7, 1850.

*To all whom it may concern:*

Be it known that I, SOLYMAN MERRICK, of Springfield, in the county of Hampden and State of Massachusetts, have invented a new and useful Improvement in Feeders for Screw and Pin Machines; and I do hereby declare that the following is a full, clear, and exact description of the principle or character of my invention, which distinguishes it from all other things before known, and of the method of making, constructing, and using the same, reference being had to the accompanying drawings, making part of this specification, in which—

Figure 3:
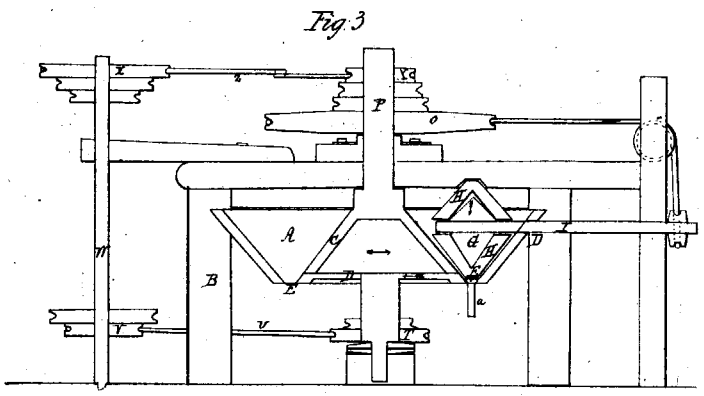
Figure 2:
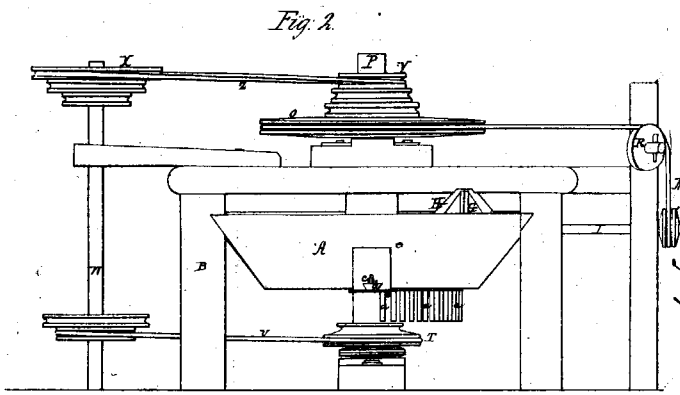
Figure 5:
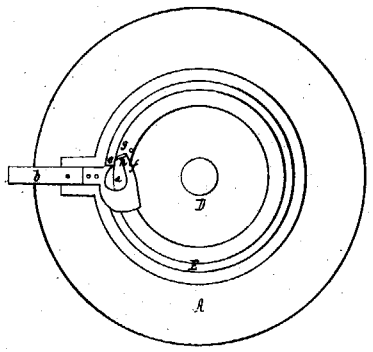
Figure 1:
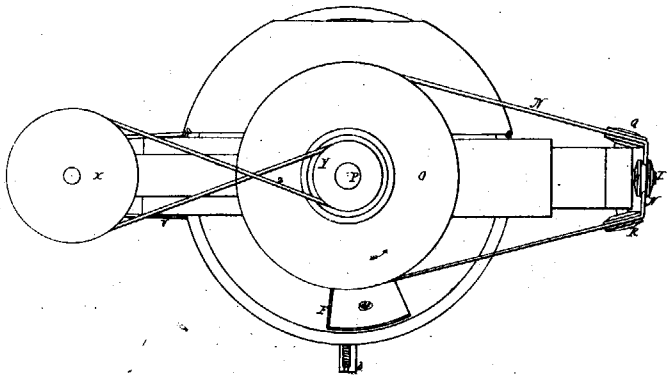
Figure 4:
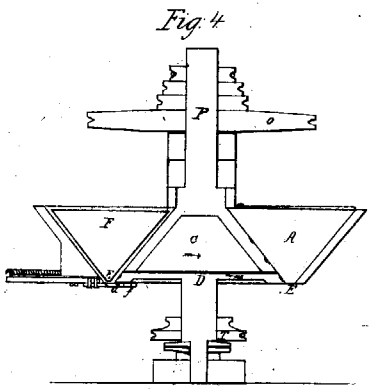

Figure 1 is a top view; Fig. 2, a front elevation; Fig. 3, a longitudinal, vertical, and central section; Fig. 4, a transverse vertical section, and Fig. 5 an inverted horizontal section taken just below the check-motion which governs the feed-motion.

The same letters indicate like parts in all the figures.

The principle or character which distinguishes my invention from all other things before known consists, first, in arranging screw-blanks, pins, and other like or similarly-headed articles, so as to present them with the points or heads all in the same direction by oppositely-inclined beveled or curved surfaces, with sufficient space between them to receive freely the shanks of such articles while they hang suspended by their heads, operated, essentially, in the manner hereinafter described; second, in making one of the said inclined beveled or curved surfaces in two parts, one above the other, to aid in giving to the screw-blanks or other articles the required tendency toward the space between the said surfaces; third, in combining with the said oppositely-inclined beveled or curved surfaces a fence or guard plate placed across from one to the other and over the space in which the screw-blanks or other articles are suspended, to prevent the passage of any which may not be properly suspended; fourth, in combining with the oppositely-inclined beveled or curved surfaces revolving arms, wings, or beaters to knock or beat back the surplus screw-blanks or other articles, and prevent any but such as are properly suspended from passing toward the point of delivery; and, lastly, in combining with the said oppositely inclined and moving surfaces a checking and delivering apparatus to deliver out, in succession, the screw-blanks and other articles.

In the accompanying drawings, A represents a conical hopper, sustained in position by a suitable frame-work, B. Two conic frusta, C D, are disposed within the said hopper, the one above the other, and sustained upon the shaft or bearings, having the same axis of motion as seen in the drawings. The said conic frusta should revolve in contrary directions, as denoted by arrows in the figures. The diameter of the base of the lower frustum is somewhat less than the diameter of the lower part of the interior of the hopper, there being a circular space, E, left between them of a width to correspond with the diameter of the shank of each of the screw-blanks, &c., and permit them to move freely through it, as will be hereinafter described. The interior surfaces of the two conic frusta should be roughened or indented in such manner as to act upon the screw or pin blanks, &c., and cause them to revolve. Generally speaking, the angles of inclination of the exterior edge of the two conic frusta and the interior edge of the hopper with respect to a horizontal plane are to be equal, or about equal, as denoted in Figs. 3 and 4. Between the inner face of the hopper and the outer faces of the two frusta I extend a partition plate, fence, or guard, F, which I secure to the hopper and permit to approach as near as possible toward the frusta and not interfere with their revolving movements, and at a suitable distance from or on the right of the said fence or guard and between the interior face of the hopper and exterior faces of the frusta I arrange a revolving beater, G. The said beater consists of one or more triangular or other suitably shaped plates, H H, applied to a horizontal shaft, I, extending into the hopper and sustained in bearings at L M, as represented in the drawings. The said beater may be revolved by an endless band, N, which may pass around a grooved pulley, O, placed upon the shaft P of the upper conic frustum, and thence over guide-pulleys Q R and under a small pulley, S, fixed upon the shaft of the beater. The lower conic frustum should have a pulley, T, fixed upon its axis. From the said pulley an endless belt, U, proceeds to and around a pulley, V, fixed upon a vertical shaft, W. The said shaft has another pulley, X, fixed upon its upper end, the said pulley communicating with another—viz., Y—upon the shaft of the upper conic frustum by a crossed band, Z.

Instead of the aforesaid mode of giving motion to the several parts any suitable gear-work may be adopted.

The screw or other blanks of the kind are to be thrown previously into the hopper on the left-hand side of the partition or fence F. As the upper conic frustum, C, revolves from left to right and the lower one, D, from right to left, they will distend the screw-blanks which come in contact with them in such manner as to cause them to successively move downward toward the circular space E, before mentioned, through which the shanks will fall until arrested in vertical position by the heads of the blanks coming into contact with the adjacent inclined surfaces of the lower conic frustum and the hopper. As the lower frustum continues to revolve it will advance each screw-blank through the circular space E in the direction in which it (the frustum) travels. The circular space E will thus be filled with screw-blanks, whose shanks stand in vertical positions, as denoted at *a a*. The object of the beater is to prevent any one of the screw-blanks from overriding the others or passing toward the delivery, if they are not in a proper position in the space E. The object of the upper conic frustum is to prevent the blanks from being carried around toward the beater in too great a body. It also facilitates the downward movement of the blanks toward the space E. The triangular wings or arms of the beater, shaped as seen in Fig. 3, revolve in the opposite direction of the lower conic frustum. They therefore throw or keep back such blanks as are not properly suspended in the space E.

The next part of the apparatus is that by which the blanks are regularly delivered or fed from the circular space E. It consists of a horizontal slide-plate, *b*, (see Fig. 5, which represents a view of the under sides of the hopper and lower conic frustum, D,) affixed to the lower edge of the hopper just on the right of the partition F, the said plate being suitably sustained, so as to slide toward and from the axis of the lower conic frustum. It is forced inward or toward the axis of the frustum by means of a spring, *c*, applied to it and attached to the hopper. The said check-plate has a circular aperture, *d*, cut through one end of it, and a passage, *e*, into said aperture cut through the side of the plate, the whole being as seen in the drawings. The inner end of the plate is cone-shaped, as seen at *f*, so that when a stud, *g*, projecting from the under side of the lower frustum, is brought into contact with it, it (the stnd) shall press the slide outward or in a direction away from the frustum and bring the passage *e* into line, or so as to correspond with the circular opening E. When this takes place, the movement of the lower frustum will carry one of the screw-blanks through the passage *e* and cause it to drop out of the machine, the circular aperture *d* being made larger in its diameter than that of the head of the blank.

The inner periphery of the conical hopper is formed with a recess just under the check-slide, (not seen in the drawings,) of sufficient capacity for the free passage of the heads of the screw-blanks or other articles when delivered by the check-slide.

There is a small stud, *h*, fixed upon the rear side of the entrance *e* of the slide, as seen in the drawings. When the slide is pressed outward, this stud enters between the screw-blank which is to be discharged and the one next to it, and thereby prevents the escape of the latter. As soon as the blank is discharged, the slide-plate should be moved inward by its spring. The screw or pin or other blank thus discharged may be received by or into any apparatus calculated to hold or dispose of it for any other operation necessary to be next performed.

It will be obvious from the foregoing that instead of the two central conical frusta, a single one may be used, as the upper one is only to facilitate the arrangement of the screw-blanks, &c., that they may freely enter the space E below; that the inclined surfaces, instead of being a rotating cone within a surrounding hopper, either of them may consist of a chain belt having their surfaces arranged relatively, so as to be the equivalent of the cone and hopper; and as to the beater, it may be used in combination with any other arrangement of two inclined beveled or curved surfaces adapted to the arrangement of the screw-blanks, &c., with their shanks hanging down between them and moving forward toward a point of delivery, the object of such rotating beater being to knock back and prevent the passage toward the point of delivery of any of the screw-blanks, &c., until they are properly arranged with their shanks hanging down and suspended by their heads on the lower edges of the inclined beveled or curved surfaces; nor do I wish to limit the combination of the central frustum and surrounding conical hopper and check or delivery apparatus to the special kind of sliding check herein specified, as any other kind of check or delivery apparatus which will prevent the delivery of the screw-blanks, &c., except at the required periods, will fulfill the requirements of this part of my invention, as I have simply described that mode of applying this construction which I had essayed with success and deemed the best.

What I claim as my invention, and desire to secure by Letters Patent, is—

1. The method, substantially as described, of arranging screw-blanks, &c., by the motion of oppositely-inclined beveled or curved surfaces with sufficient space between them to receive freely the shanks of the blanks while they hang suspended by their heads, the said motion of such surfaces being in the direction of the space between them, substantially as described.

2. Making one of the said inclined beveled or curved surfaces in two parts, one above the other, substantially in the manner and for the purpose specified.

3. Combining with the said oppositely-inclined beveled or curved surfaces a fence or guard-plate placed across from the one toward the other and over the space in which the blanks are suspended, substantially in the manner and for the purpose specified.

4. In combining with oppositely-inclined beveled or curved surfaces revolving arms, wings, or beaters, substantially in the manner and for the purpose specified.

5. In combining with the said oppositely-inclined beveled or curved surfaces a checking and delivering apparatus, substantially in the manner and for the purpose specified.

SOLYMAN MERRICK.

Witnesses:
HENRY VOSE,
GEO. DWIGHT.